(12) United States Patent
Nagara

(10) Patent No.: US 6,731,584 B1
(45) Date of Patent: May 4, 2004

(54) OPTICAL INFORMATION REPRODUCING APPARATUS AND METHOD OF SETTING THE QUANTITY OF LIGHT IN OPTICAL INFORMATION REPRODUCING APPARATUS

(75) Inventor: Toru Nagara, Tokyo (JP)

(73) Assignee: Sony Corporation, Tokyo (JP)

( * ) Notice: Subject to any disclaimer, the term of this patent is extended or adjusted under 35 U.S.C. 154(b) by 632 days.

(21) Appl. No.: 09/606,329

(22) Filed: Jun. 29, 2000

(30) Foreign Application Priority Data

Jun. 30, 1999 (JP) .......................................... 11-184541

(51) Int. Cl.[7] ................................................ G11B 7/00
(52) U.S. Cl. ...................................... 369/116; 369/47.5
(58) Field of Search .......................... 369/44.25, 44.26, 369/47.15, 47.5, 115, 116, 53.26

(56) References Cited

U.S. PATENT DOCUMENTS

| 5,059,780 A | * | 10/1991 | Kakuta et al. ............... 369/116 |
| 5,365,535 A | * | 11/1994 | Yamaguchi et al. .......... 369/121 |
| 5,386,409 A | * | 1/1995 | Yokota et al. ............... 369/116 |
| 5,590,111 A | * | 12/1996 | Kirino et al. ............. 369/47.53 |
| 5,629,913 A | * | 5/1997 | Kaku et al. ............... 369/47.52 |
| 5,790,482 A | * | 8/1998 | Saga et al. ................ 369/47.51 |
| 5,793,736 A | * | 8/1998 | Ishimaru et al. .......... 369/53.26 |
| 6,421,314 B1 | * | 7/2002 | Maruyama ................... 369/116 |

* cited by examiner

Primary Examiner—Thang V. Tran
Assistant Examiner—Bach Q Vuong
(74) Attorney, Agent, or Firm—Frommer Lawrence & Haug LLP; William S. Frommer; Darren M. Simon (57) ABSTRACT

An optical information reproducing apparatus and a method of setting the quantity of light in an optical information reproducing apparatus that can be applied to an optical disk apparatus for accessing a phase-change-type optical disk for easily and reliably selecting conditions for driving a laser diode with a drive signal having a high-frequency signal superimposed thereon. The power of a laser beam is set such that the peak power of the laser beam except for a relaxation oscillation component does not exeed a power Pe required to erase data.

21 Claims, 9 Drawing Sheets

OPTICAL INFORMATION REPRODUCING APPARATUS AND METHOD OF SETTING THE QUANTITY OF LIGHT IN OPTICAL INFORMATION REPRODUCING APPARATUS

BACKGROUND OF THE INVENTION

The present invention relates to an optical information reproducing apparatus and a method of setting a quantity of light in an optical information reproducing apparatus that may be applied to an optical disk apparatus for accessing a phase-change-type optical disk.

In an optical disk apparatus for accessing a phase-change-type optical disk, a drive signal having a high-frequency sine-wave signal superimposed thereon may be applied to drive a laser diode for intermittently energizing the laser diode to reproduce information recorded in the optical disk. As a result, the Signal-to-Noise ("S/N") ratio of a reproduced signal is effectively prevented from being degraded by the introduction of noise into the laser beam. However, by driving the playback laser diode with such a drive signal, some of the information recorded at an increased recording density in the optical disk may be erased even if the average power is sufficiently lower than the power required to erase data. The erasure of information causes increased jitter upon reproduction. Therefore, this type of optical disk apparatus must operate at optimum conditions, by setting an ideal Direct Current ("DC") signal level of a drive signal and amplitude of a high-frequency sine-wave signal in its designing stage, when applying the laser beam.

OBJECTS OF THE INVENTION

If the driving conditions can be selected easily based on the DC signal level of the drive signal and the amplitude of the high-frequency sine-wave signal, then the process of designing the optical disk apparatus may be simplified, and optical disks having different characteristics may be handled appropriately.

Therefore, an object of the present invention is to overcome the above-described problem(s) by providing an optical information reproducing apparatus and a method of setting the quantity of light in an optical information reproducing apparatus for easily and reliably selecting conditions to drive a laser diode with a drive signal having a high-frequency signal superimposed thereon.

Other objects and advantages of the invention will in part be obvious and will in part be apparent from the specification and the drawings.

SUMMARY OF THE INVENTION

In accordance with an embodiment of the present invention, the power of a playback laser beam may be set such that the peak power of the laser beam except for a relaxation oscillation component does not exceed the power required to erase data recorded in an optical information recording medium. The relaxation oscillation component of the laser beam has a large chromatic dispersion and a small heating effect when focused on optical information recording medium. Consequently, if the power of the laser beam is set such that the peak power of the laser beam except for the relaxation oscillation component does not exceed the power required to erase data recorded in optical information recording medium, then driving conditions can easily and reliably be established.

Thus, in accordance with the invention, conditions for driving a laser diode with a drive signal having a high-frequency signal superimposed thereon may be easily and reliably selected.

BRIEF DESCRIPTION OF THE DRAWINGS

The above-mentioned objects, as well as additional objects, features, and advantages of the present invention will become readily apparent from the following detailed description thereof, which is to be read in conjunction with the accompanying drawings, in which.

DETAILED DESCRIPTION OF THE PREFERRED EMBODIMENTS

Figure 1:
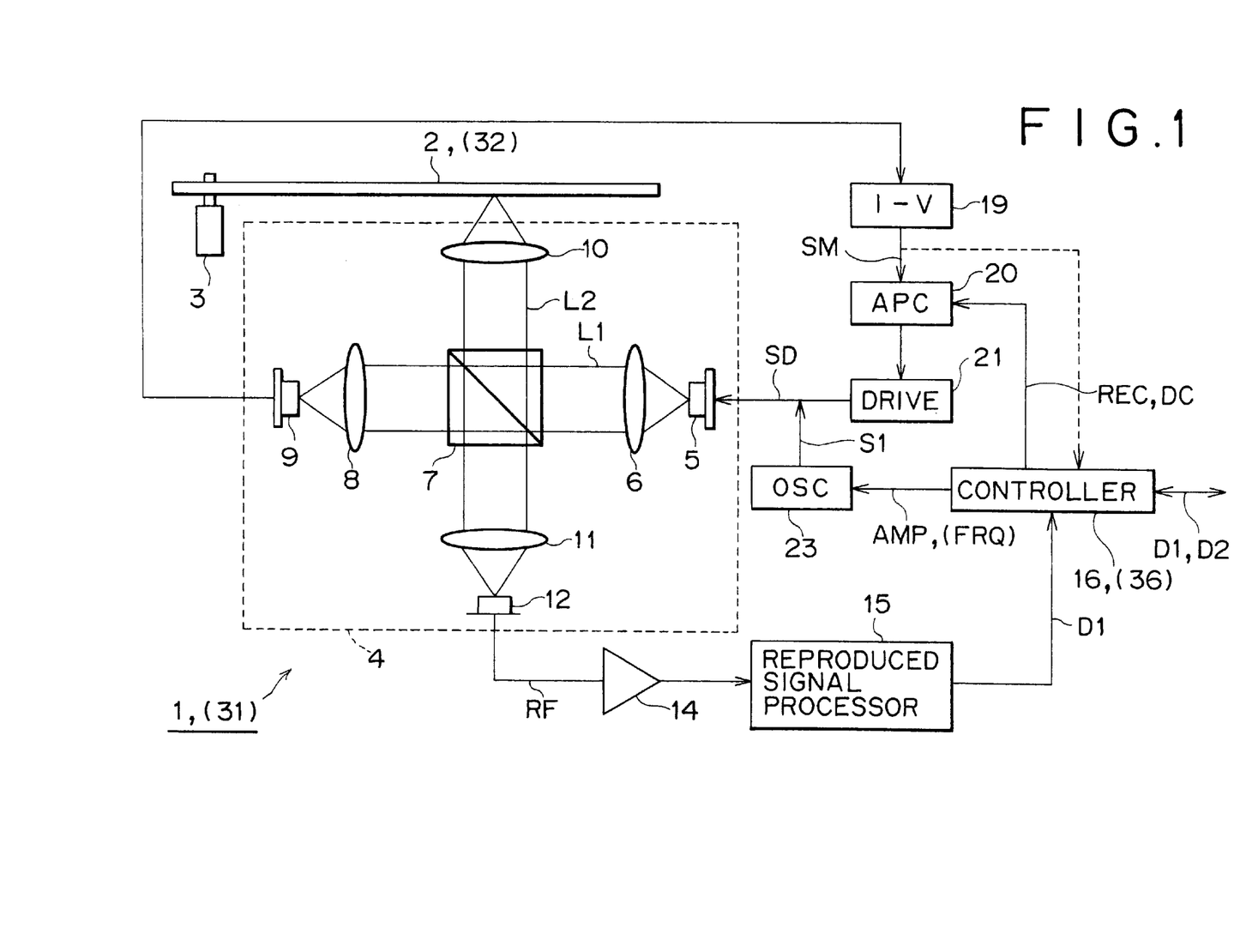
FIG. 1 is a block diagram of an optical disk apparatus in accordance with an embodiment of the present invention.

FIG. 1 is a block diagram of a central portion of an optical disk apparatus 1 according to an embodiment of the present invention. Optical disk apparatus 1 records data in an optical disk 2 and reproduces and outputs data recorded in optical disk 2.

Optical disk 2 is a replaceable phase-change-type optical disk, and can be rotated at a predetermined speed by a spindle motor 3. An optical pickup 4 applies a laser beam L1 to optical disk 2 and detects a feedback beam L2 therefrom to generate and output a reproduced signal RF whose signal level varies depending on a train of marks formed on optical disk 2. Optical pickup 4 also intermittently increases the power of laser beam L1 applied to optical disk 2 for thermally recording data in optical disk 2.

Specifically, optical pickup 4 has a semiconductor laser diode 5 which is driven by a drive signal SD to emit laser beam L1, and a collimator lens 6 which converts laser beam L1 into a substantially parallel beam that is then applied to a beam splitter 7. Beam splitter 7 reflects and passes laser beam L1 for dividing laser beam L1 into two laser beams. A relay-lens 8 focuses the portion of laser beam L1 that passes through beam splitter 7 onto a photodetector 9. Optical pickup 4 can thus determine the power of laser beam L1 based on the signal detected at photodetector 9.

Optical pickup 4 also has an objective lens 10 which focuses the portion of laser beam L1 that is reflected by beam splitter 7 onto an information recording surface of optical disk 2, and guides feedback beam L2 reproduced from optical disk 2 to beam splitter 7. A relay lens 11 focuses the portion of feedback beam L2 that passes through beam splitter 7 onto a photodetector 12. Optical pickup 4 can therefore reproduce information recorded in optical disk 2 based on the signal detected at photodetector 12.

Optical pickup 4 may also include, in addition to optical system shown in FIG. 1, a detecting system (not shown) for detecting a tracking error signal and a focus error signal, and objective lens 10 may be subject to tracking control based on the tracking error signal and the focus error signal detected by the detecting system.

Optical disk apparatus 1 generates reproduced signal RF from the signal detected at photodetector 12. An amplifier 14 amplifies reproduced signal RF with a predetermined gain. A reproduced signal processor 15 identifies binary values of amplified reproduced signal RF to generate reproduced data D1, and outputs reproduced data D1 to a controller 16 after performing error correction on reproduced data D1. Controller 16 then outputs reproduced data D1 (recorded in optical disk 2) to a host apparatus (not shown).

A current-to-voltage converter (I-V) 19 converts the current of the signal detected at photodetector 9 into a voltage for generating a monitor signal SM whose signal level varies depending on the power of laser beam L1.

An automatic light-quantity control circuit (APC) 20 outputs a control signal to a drive 21 based on a result of comparison between the DC signal level of monitor signal SM and a predetermined reference level DC' for preventing the power of laser beam L1 from changing due to changes in the temperature of semiconductor laser diode 5. When optical disk 2 is reproduced, automatic light-quantity control circuit 20 outputs a control signal such that the DC signal level of monitor signal SM is equalized to signal level DC' indicated by controller 16, and hence outputs a control signal such that the average power of laser beam L1 depends on the power determined by signal level DC'. When data is recorded in optical disk 2, automatic light-quantity control circuit 20 changes the signal level of the control signal outputted to drive 21 with a recording signal REC depending on recording data D2 received at controller 16.

Drive 21 generates a drive signal SD for driving semiconductor laser diode 5 from the control signal outputted from automatic light-quantity control circuit 20, thereby intermittently increasing the power of laser beam L1 depending on recording signal REC at the time data is recorded in optical disk 2.

An oscillator (OSC) 23 generates a high-frequency sine-wave signal S1 having a predetermined frequency, and superimposes high-frequency sine-wave signal S1 on drive signal SD for reproducing optical disk 2. When optical disk apparatus 1 reproduces optical disk 2, semiconductor laser diode 5 is intermittently energized to effectively prevent the S/N ratio of reproduced signal RF from being degraded due to the introduction of noise into laser beam L1. Oscillator 23 outputs high-frequency sine-wave signal S1 with an amplitude value AMP indicated by controller 16. Therefore, for reproducing optical disk 2, optical disk apparatus 1 drives semiconductor laser diode 5 with drive signal SD, which has signal level DC' indicated by controller 16, and on which high-frequency sine-wave signal S1 with amplitude AMP indicated by controller 16 is superposed.

Controller 16 comprises a microcomputer for controlling the overall operation of optical disk apparatus 1. The operation of controller 16 is controlled by the host (apparatus) to control optical disk apparatus 1 for recording data D2 outputted from the host apparatus in optical disk 2 and reproducing data D1 recorded in optical disk 2. In this controlling operation, when optical disk 2 is reproduced, controller 16 controls the operation of automatic light-quantity control circuit 20 and oscillator 23, sets signal level DC' for drive signal SD under predetermined conditions, and also sets amplitude AMP of high-frequency sine-wave signal S1 to be superimposed on drive signal SD.

At signal level DC' for drive signal SD, controller 16 establishes an average power value Pr of laser beam L1 with respect to a lower limit value for erasing power Pe to satisfy formula (1), as follows:

$$Pr < Pe/2 \quad (1)$$

Figure 3:
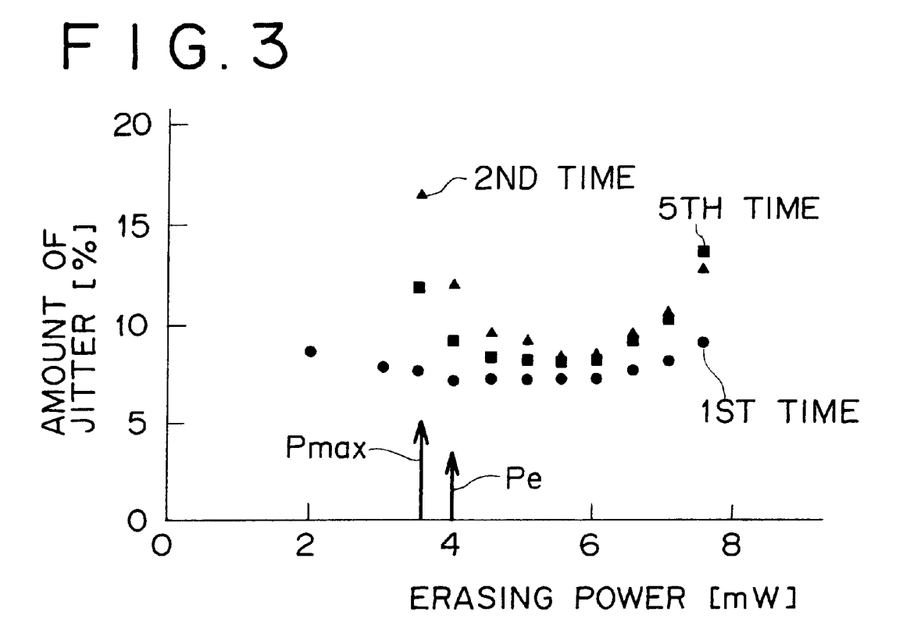
FIG. 3 is a diagram of characteristic curves illustrative of conditions for reproducing an optical. disk.

Erasing power Pe is the power of laser beam L1 that is required to erase a train of marks formed on optical disk 2. When optical disk 2 is reproduced after being irradiated by laser beam L1 whose power is at varied levels higher than erasing power Pe, reproduced signal RF with an amount of jitter shown in FIG. 3 is detected from optical disk 2. In FIG. 3, characteristic curves are plotted while laser beam L1 is applied at a linear velocity of 4.8 [m/sec]. FIG. 3 shows a plurality of characteristic curves, e.g., first and second characteristic curves, etc., each plotted after repetitive recording and erasure operations.

If recorded marks on optical disk 2 are not sufficiently erased, then jitter is observed when data is subsequently recorded and erased in making use of this kind of optical disk. In this embodiment, lower limit for erasing power Pe is set to about 4 mW, as indicated by an arrow in FIG. 3.

Amplitude AMP of high-frequency sine-wave signal S1, as converted into the power of laser beam L1 and represented by an amplitude MOD, is established to satisfy formula (2) shown below. In this embodiment, even when the signal level of drive signal SD is lower than a threshold voltage TH at which semiconductor laser diode 5 starts oscillating, it is assumed that the power of laser beam L1 varies depending on the signal level of drive signal SD similar to the case where the signal level of drive signal SD is equal to or higher than threshold voltage TH, and amplitude AMP of high-frequency sine-wave signal S1 is converted into the power of laser beam L1.

$$2 \times Pr < MOD < 2 \times (Pe - Pr) \quad (2)$$

High-frequency sine-wave signal S1 is set such that amplitude MOD, as converted into the power of laser beam L1, is higher than twice the average power Pr and lower than twice the power produced when average power Pr is subtracted from power Pe required to erase data.

Figure 2A:
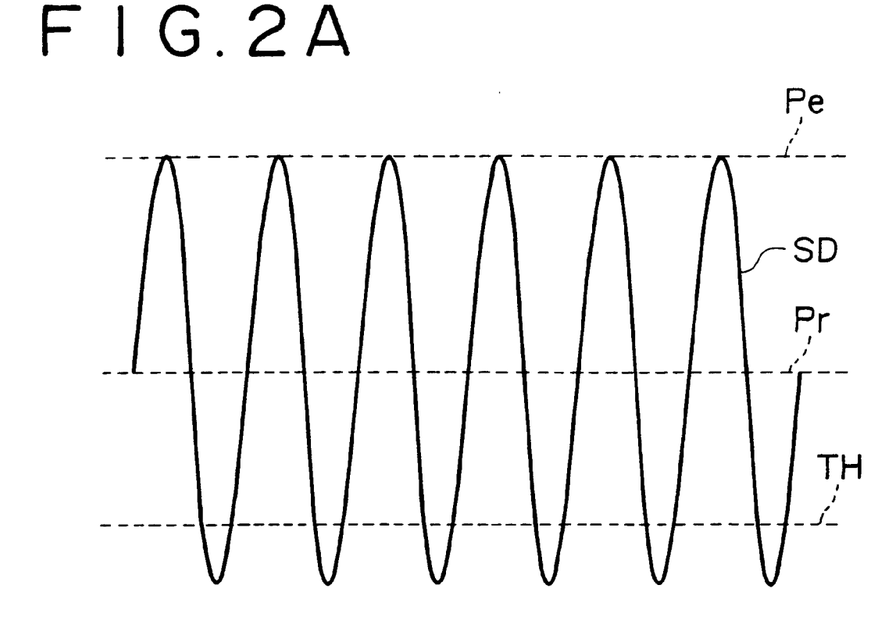
FIGS. 2A and 2B are diagrams of signal waveforms illustrative of conditions for driving a semiconductor laser diode in the optical disk apparatus of FIG. 1.
Figure 2B:
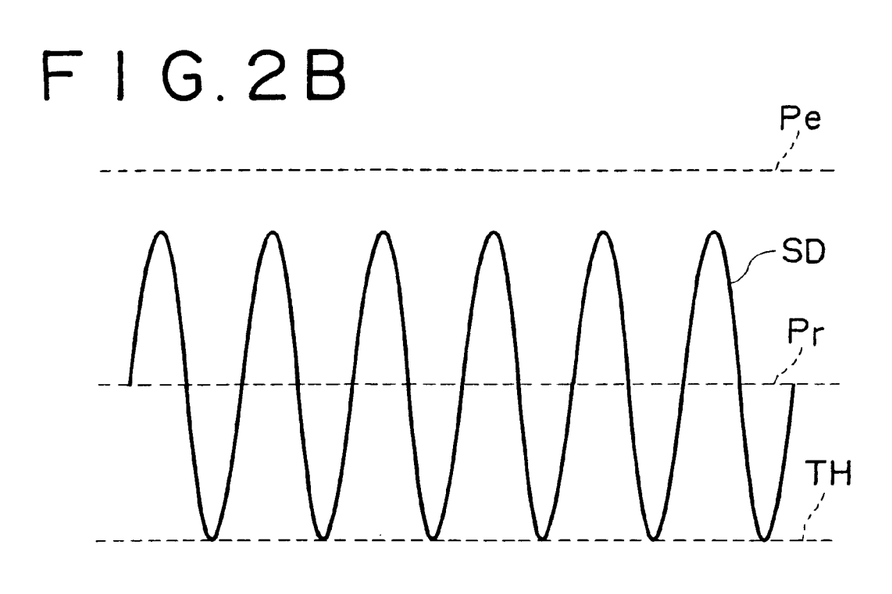

As indicated in FIG. 2B by the relationship between drive signal SD having high-frequency sine-wave signal S1 superimposed thereon and the power of laser beam L1, controller 16 sets drive signal SD such that average power Pr of laser beam L1 is lower than ½ of lower limit value Pe for the erasing power. Therefore, even when the signal level of drive signal SD crosses threshold voltage TH (set to 0 V in this embodiment) for starting oscillation, there is a certain margin provided between the peak of drive signal SD and lower limit for erasing power Pe.

With respect to the amplitude of high-frequency sine-wave signal S1, specifically, as indicated in FIG. 2A, amplitude MOD having changes in the quantity of light detected except for a relaxation oscillation component, the power of laser beam L1 does not exceed lower limit for erasing power Pe, and the bottom side thereof crosses threshold voltage TH for starting oscillation. FIGS. 2A and 2B show maximum and minimum values of the amplitude of high-frequency sine-wave signal S1 under the conditions defined by formulas (1) and (2). In this embodiment, the peak power of laser beam L1 detected except for a relaxation component is set to satisfy the above conditions, i.e., to about 3.8 mW, as indicated by Pmax in FIG. 3.

The relaxation oscillation component is a component in a multimode emitted immediately after a semiconductor laser diode starts oscillating. Specifically, it is considered that the semiconductor laser diode starts oscillation when the signal level of the drive signal increases beyond the threshold value for starting oscillation, and a mechanism of stimulated emission is established upon elapse of a given period of time immediately after the start of oscillation. The relaxation oscillation component is a component emitted immediately after the start of oscillation until the mechanism of stimulated emission is established. It is found that since the component has a large chromatic dispersion, its proportion for contributing to the heating an optical disk with respect to a coherent component due to stimulated emission except for the above component is very small.

Figure 4:
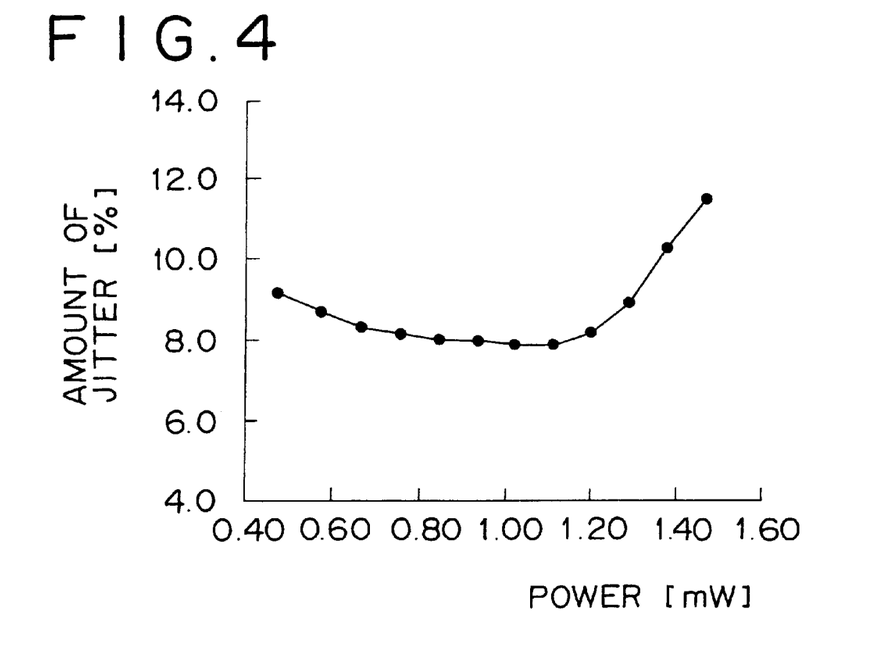
FIG. 4 is a diagram of a characteristic curve showing the relationship between the average power of a laser beam and the amount of jitter when the frequency of a high-frequency sine-wave signal is set to 270 MHz.
Figure 5:
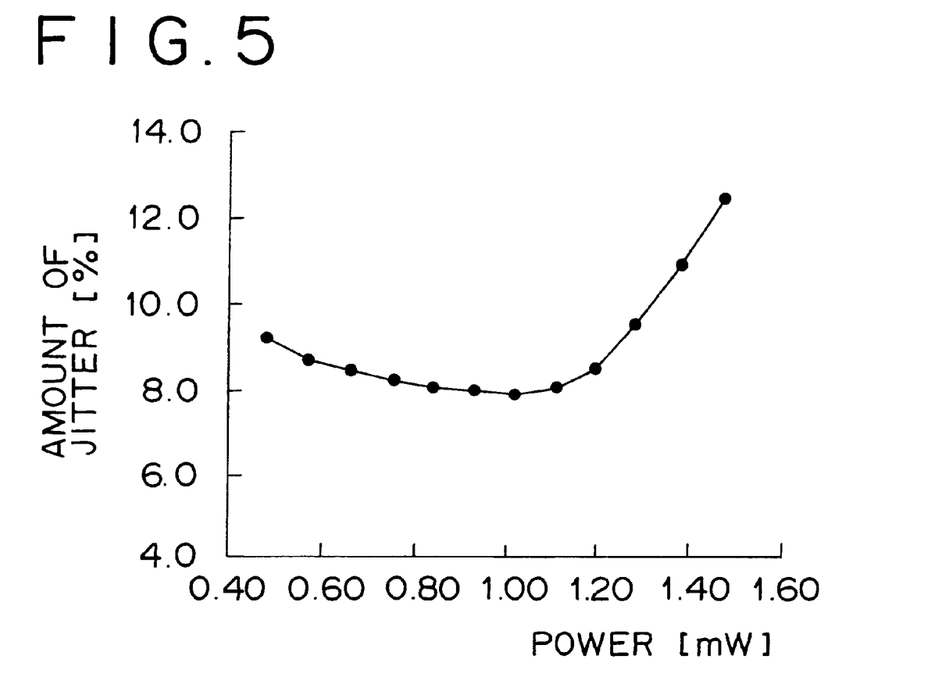
FIG. 5 is a diagram of a characteristic curve showing the relationship between the average power of a laser beam and the amount of jitter when the frequency of a high-frequency sine-wave signal is set to 220 MHz.
Figure 6:
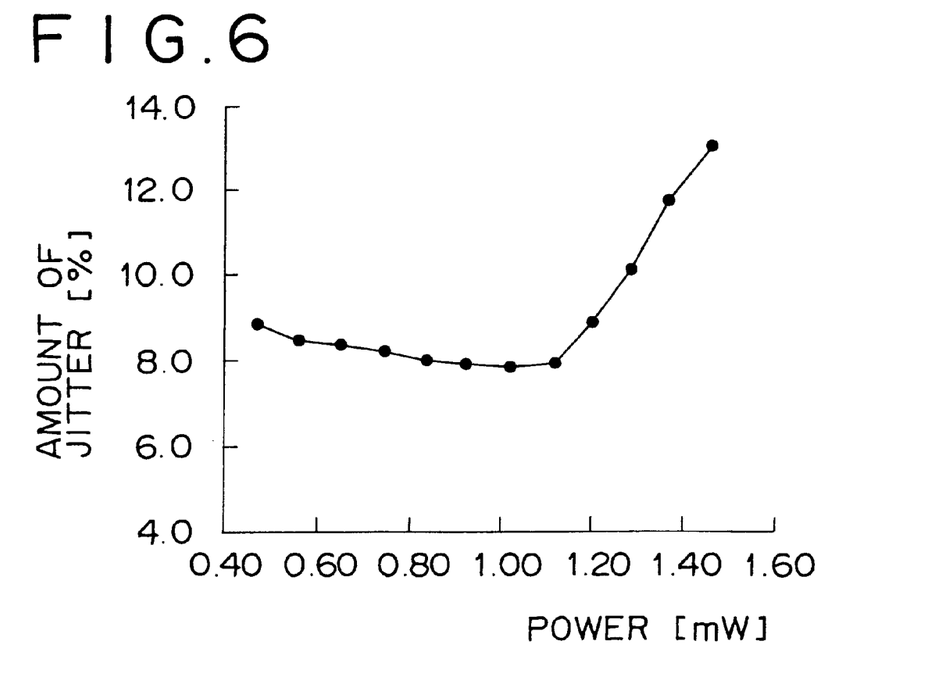
FIG. 6 is a diagram of a characteristic curve showing the relationship between the average power of a laser beam and the amount of jitter when the frequency of a high-frequency sine-wave signal is set to 170 MHz.

Specifically, as shown in FIGS. 4 through 6, with the average level of drive signal SD being fixed, the frequency of high-frequency sine-wave signal S1 is sequentially varied stepwise and the amount of jitter of reproduced signal RF is measured. The measured result shows that the amount of jitter remains almost unchanged with regard to frequency. FIG. 4 shows the amount of jitter when the frequency of high-frequency sine-wave signal S1 is 270 MHz. FIG. 5 shows the amount of jitter when the frequency of high-frequency sine-wave signal S1 is 220 MHz. FIG. 6 shows the amount of jitter when the frequency of high-frequency sine-wave signal S1 is 170 MHz. The data shown in each of FIGS. 4 through 6 is reproduced upon elapse of 2 minutes after the data is written. In each of FIGS. 4 through 6, the horizontal axis represents average power Pr of laser beam L1.

Figure 7:
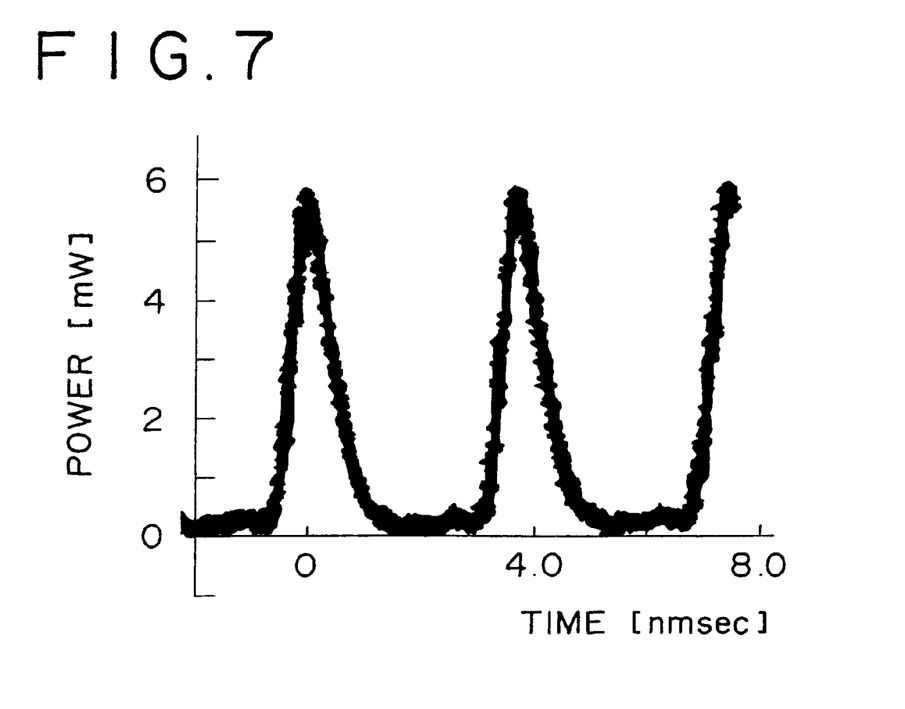
FIG. 7 is a diagram of a signal waveform showing changes in the power of a laser beam when the frequency of a high-frequency sine-wave signal is set to 270 MHz.
Figure 8:
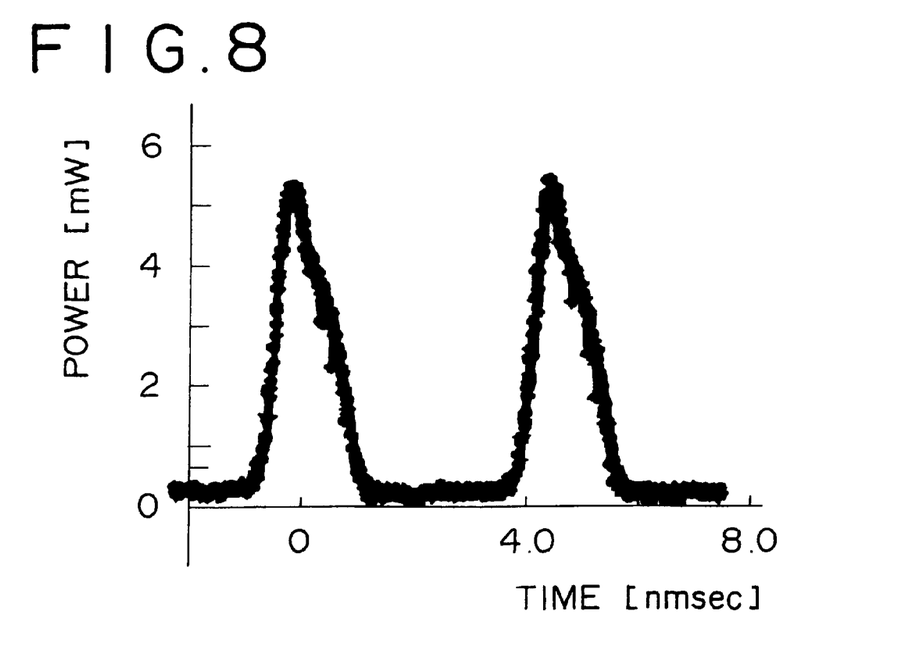
FIG. 8 is a diagram of a signal waveform showing changes in the power of a laser beam when the frequency of a high-frequency sine-wave signal is set to 220 MHz.
Figure 9:
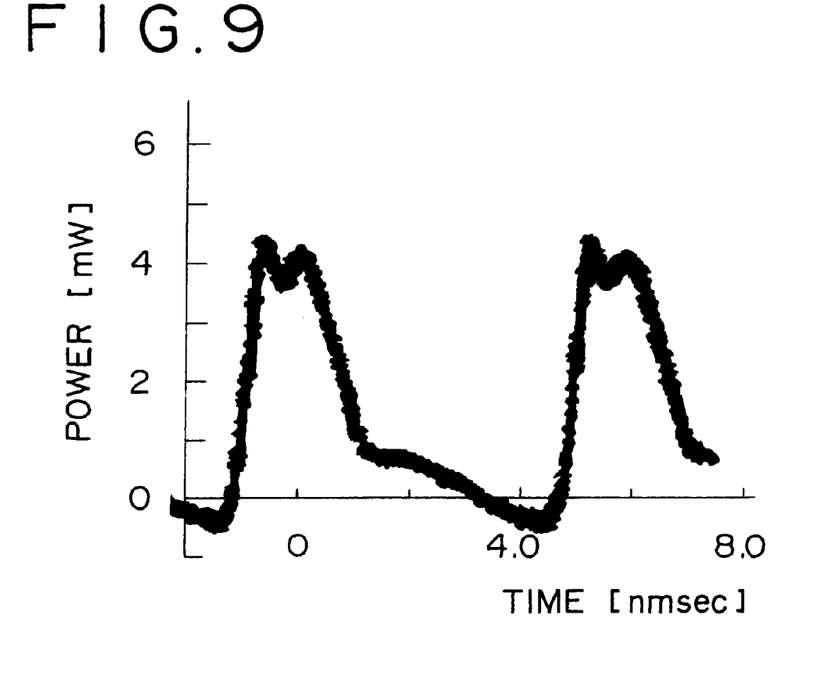
FIG. 9 is a diagram of a signal waveform showing changes in the power of a laser beam when the frequency of a high-frequency sine-wave signal is set to 170 MHz.

Under the conditions shown in FIGS. 4 through 6, the power of laser beam L1 at the same average power Pr is indicated by the signal waveform of monitor signal SM. As shown in FIGS. 7 through 9, when the signal level of high-frequency sine-wave signal S1 exceeds the threshold voltage, laser beam L1 starts being outputted, and thereafter the power thereof varies depending on the signal level of high-frequency sine-wave signal S1. The signal waveforms shown in FIGS. 7 through 9 are plotted when average power Pr shown in FIGS. 5 and 6 is 1.4 mW. When the frequency of high-frequency sine-wave signal S1 is 270 MHz (in FIG. 7), it is difficult to distinguish between the relaxation oscillation component and another component because of the high frequency. When the frequency of high-frequency sine-wave signal S1 is lower (in FIGS. 8 and 9), the relationship between the relaxation oscillation component and another component can be recognized.

Figure 10:
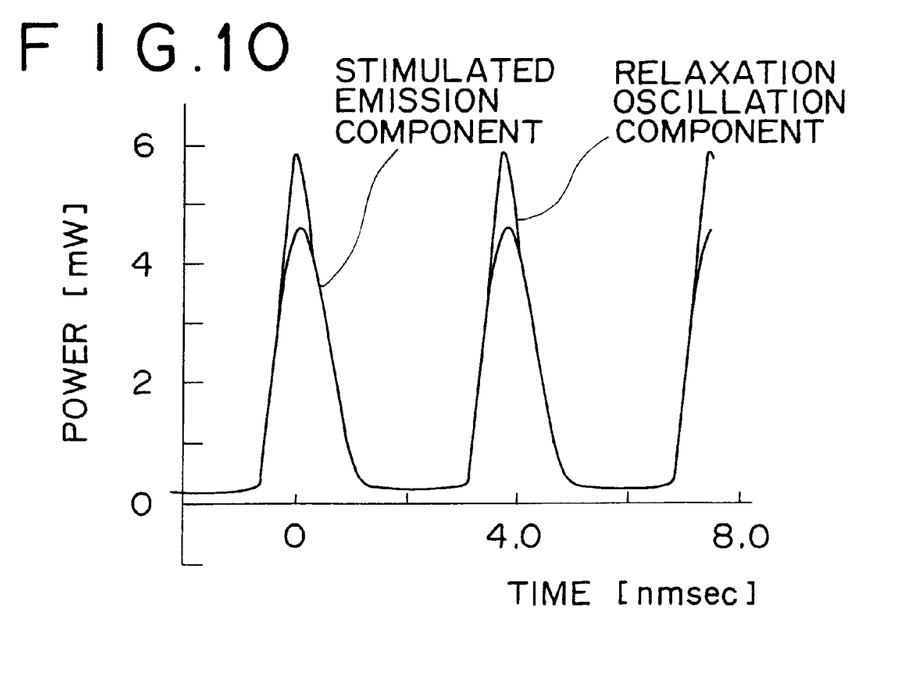
FIG. 10 is a diagram of the signal waveform shown in FIG. 7 separated into a relaxation oscillation component and another component.
Figure 11:
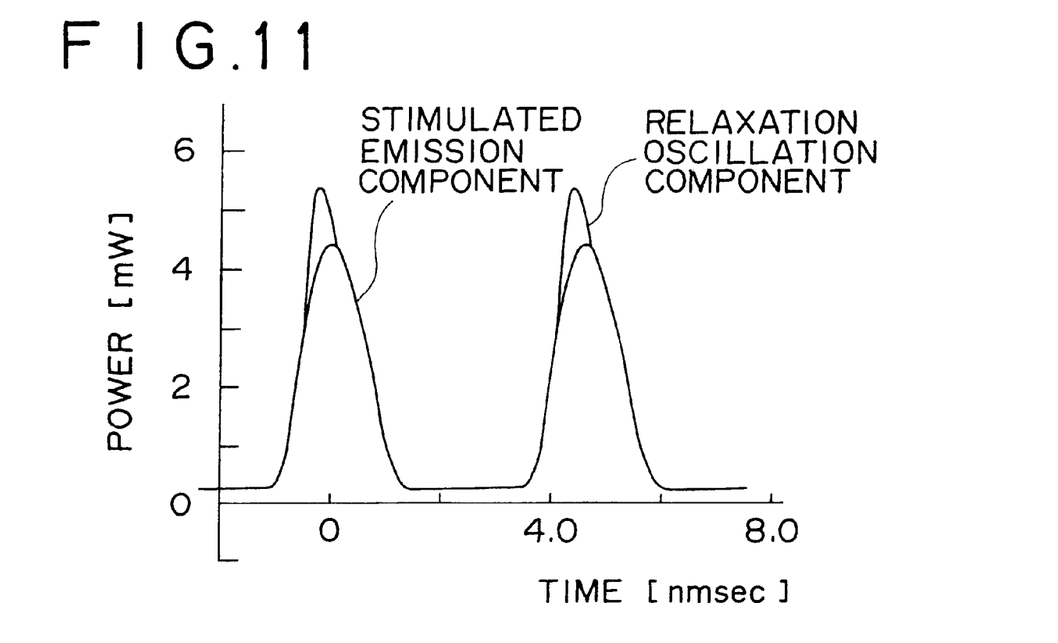
FIG. 11 is a diagram of the signal waveform shown in FIG. 8 separated into a relaxation oscillation component and another component.
Figure 12:
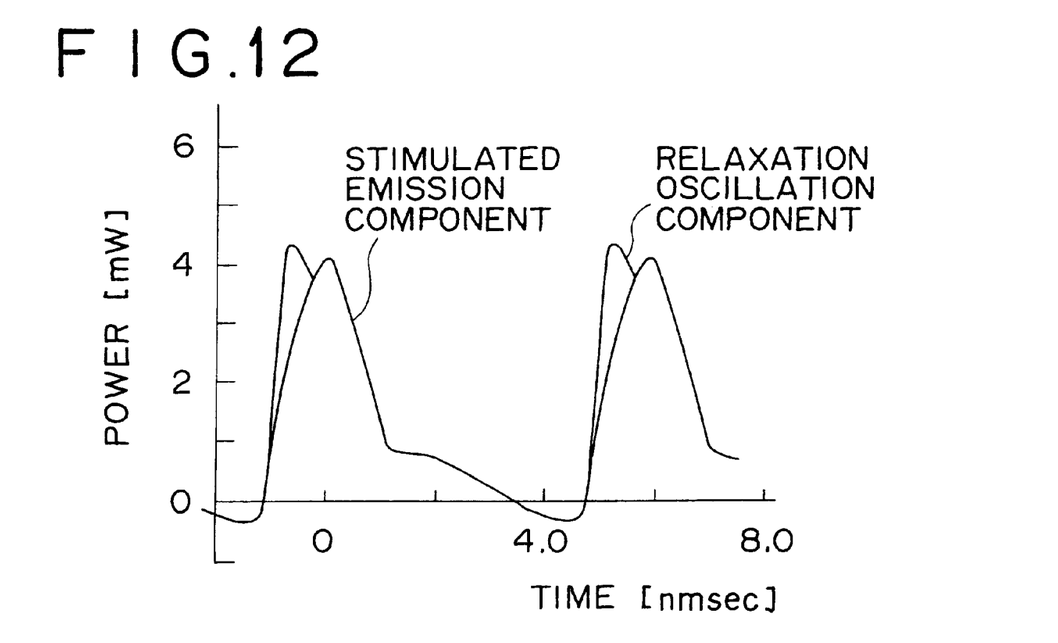
FIG. 12 is a diagram of the signal waveform shown in FIG. 9 separated into a relaxation oscillation component and another component.
Figure 13:
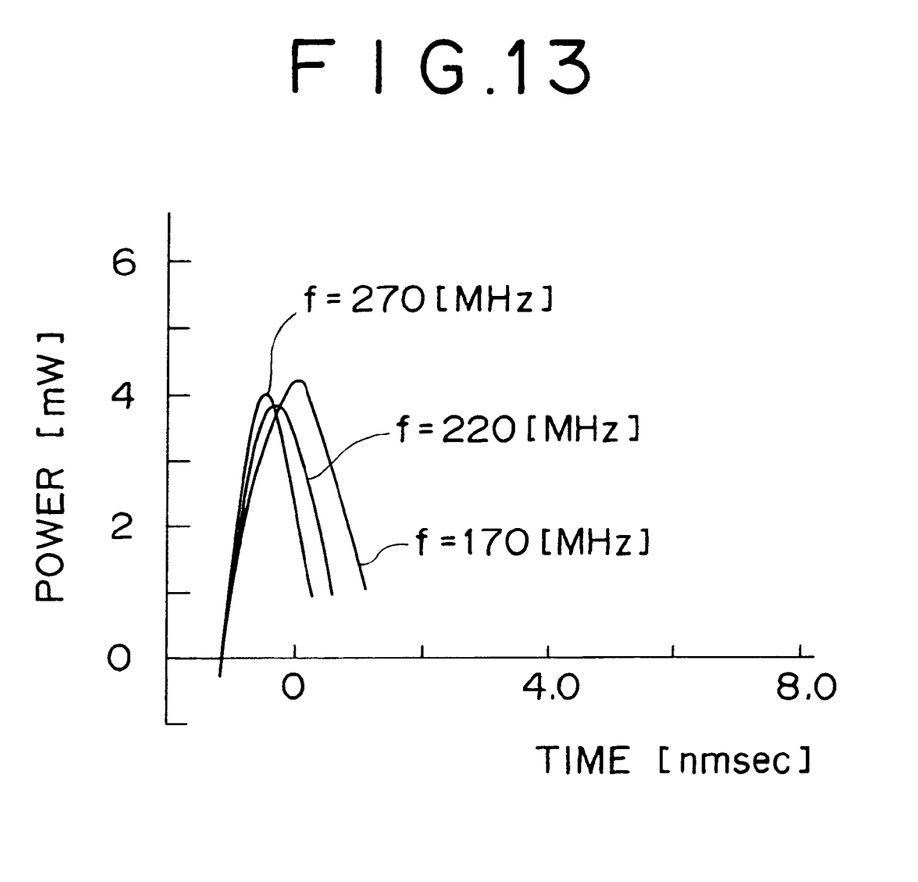
FIG. 13 is a diagram of the signal waveforms shown in FIGS. 10, 11 and 12 superimposed together.

The signal waveforms shown in FIGS. 7 through 9 with their relaxation oscillation components and other components (hereinafter referred to as simulated emission component) being separated from each other for analysis are shown in FIGS. 10 through 12, respectively. The simulated emission components shown in FIGS. 10 through 12 are collectively illustrated in FIG. 13. In FIG. 13, the peaks of the simulated emission components are illustrated at the respective frequencies of high-frequency sine-wave signal S1.

It has been revealed from the foregoing that, even if average power Pr is sufficiently lower than erasing power Pe, the recorded data reproduced by high-frequency sine-wave signal S1 is erased because the peak power of the simulated emission components exceeds erasing power Pe. As shown in FIG. 13, even when the frequency of high-frequency sine-wave signal S1 varies, the peak power due to stimulated emission does not vary greatly, and the amount of jitter contained in reproduced signal RF does not vary substantially.

Controller 16 thus establishes signal level DC' of drive signal SD and amplitude AMP of high-frequency sine-wave signal S1 under the conditions selected in its designing stage, such that the peak power due to the stimulated emission component detected by lowering frequency of high-frequency sine-wave signal S1 does not exceed erasing power Pe and semiconductor laser diode 5 is intermittently energized by high-frequency sine-wave signal S1. Controller 16 then outputs signal level DC' of drive signal SD and amplitude AMP of high-frequency sine-wave signal S1, thus established, to automatic light-quantity control circuit 20 and oscillator 23, respectively.

With the above arrangement, in optical disk apparatus 1 (FIG. 1), the power of laser beam L1 emitted from semiconductor laser diode 5 is intermittently increased depending on recording signal REC under the control of automatic light-quantity control circuit 20. Laser beam L1 is then focused onto the information recording surface of optical disk 2 through beam splitter 7 and objective lens 10. Therefore, the information recording surface of optical disk 2 is locally heated to change a phase-change film of the information recording surface to record data D2 outputted from the host apparatus to optical disk 2.

For reproducing optical disk 2, high-frequency sine-wave signal S1 outputted from oscillator 23 is superimposed on drive signal SD outputted from drive 21, and semiconductor laser diode 5 is driven by drive signal SD having high-frequency sine-wave signal S1 superimposed thereon. Semiconductor laser diode 5 is intermittently energized at the period of high-frequency sine-wave signal S1 to emit laser beam L1, which is then focused onto the information recording surface of optical disk 2. Feedback beam L2 from optical disk 2 is led via objective lens 10, beam splitter 7, and relay lens 11 to photodetector 12, whose detected signal is processed by reproduced signal processor 15 to reproduce data Dl representing data recorded in optical disk 2.

As with the case of laser beam L1 applied to optical disk 2, signal level DC' for drive signal SD and amplitude AMP of high-frequency sine-wave signal S1 are detected under the conditions selected in the designing stage of optical disk apparatus 1, such that the peak power of laser beam L1 except for the relaxation oscillation component does not exceed erasing power Pe required to erase the data, and laser beam L1 can be intermittently emitted at the period of high-frequency sine-wave signal S1. Drive 21 and oscillator 23 output drive signal SD and highfrequency sine-wave signal S1, respectively, at signal level DC' and amplitude AMP thus detected.

In optical disk apparatus 1, therefore, even if average power Pr is sufficiently lower than erasing power Pe, the power of laser beam L1 actually used to heat optical disk 2, except for the relaxation oscillation component having a small heating effect, is set so as not to exceed power Pe required to erase the data. Optical disk apparatus 1 is thus capable of stably and reliably reproducing the data recorded in optical disk 2.

As described above with respect to formulas (1) and (2) for establishing the conditions, it is only necessary to set the power of laser beam L1 actually used to heat optical disk 2, except for the relaxation oscillation component, so as not to exceed power Pe required to erase the data. Therefore, the driving conditions can easily and reliably be selected.

More specifically, average power Pr of laser beam L1 is set to a value lower than ½ of power Pe required to erase the data, and amplitude AMP of high-frequency sine-wave signal S1, as converted into the power of laser beam L1, is higher than twice the average power Pr and lower than twice the power produced when average power Pr is subtracted from power Pe required to erase the data, so that the power of laser beam L1, except for the relaxation oscillation component does not exceed power Pe required to erase the data. Thus, the driving conditions can easily and reliably be selected.

With the above arrangement, the peak power of laser beam L1 except for the relaxation oscillation component is set so as not to exceed power Pe required to erase data. As a consequence, the conditions for driving laser diode 5 with drive signal SD having high-frequency signal S1 superimposed thereon can easily and reliably be selected.

Average power Pr of laser beam L1 is set to a value lower than ½ of power Pe required to erase the data, and amplitude AMP of high-frequency sine-wave signal S1 as converted into the power of laser beam L1 is set so as to be higher than twice the average power Pr and lower than twice the power produced when average power Pr is subtracted from power Pe required to erase the data, so that the power of laser beam L1 except for the relaxation oscillation component can easily and reliably be set so as not to exceed power Pe required to erase the data.

An optical disk apparatus 31 (components of which are denoted by reference characters in parentheses in FIG. 1) according to an embodiment of the invention optimizes the above driving conditions depending on the type of an optical disk 32. Optical disk apparatus 31 according to this embodiment is essentially identical to optical disk apparatus 1 except that some components are different. For example, optical disk 32 for use in optical disk apparatus 31 may be a phase-change-type optical disk, and erasing power Pe is recorded as a reference power in an innermost lead-in area thereof.

Figure 14:
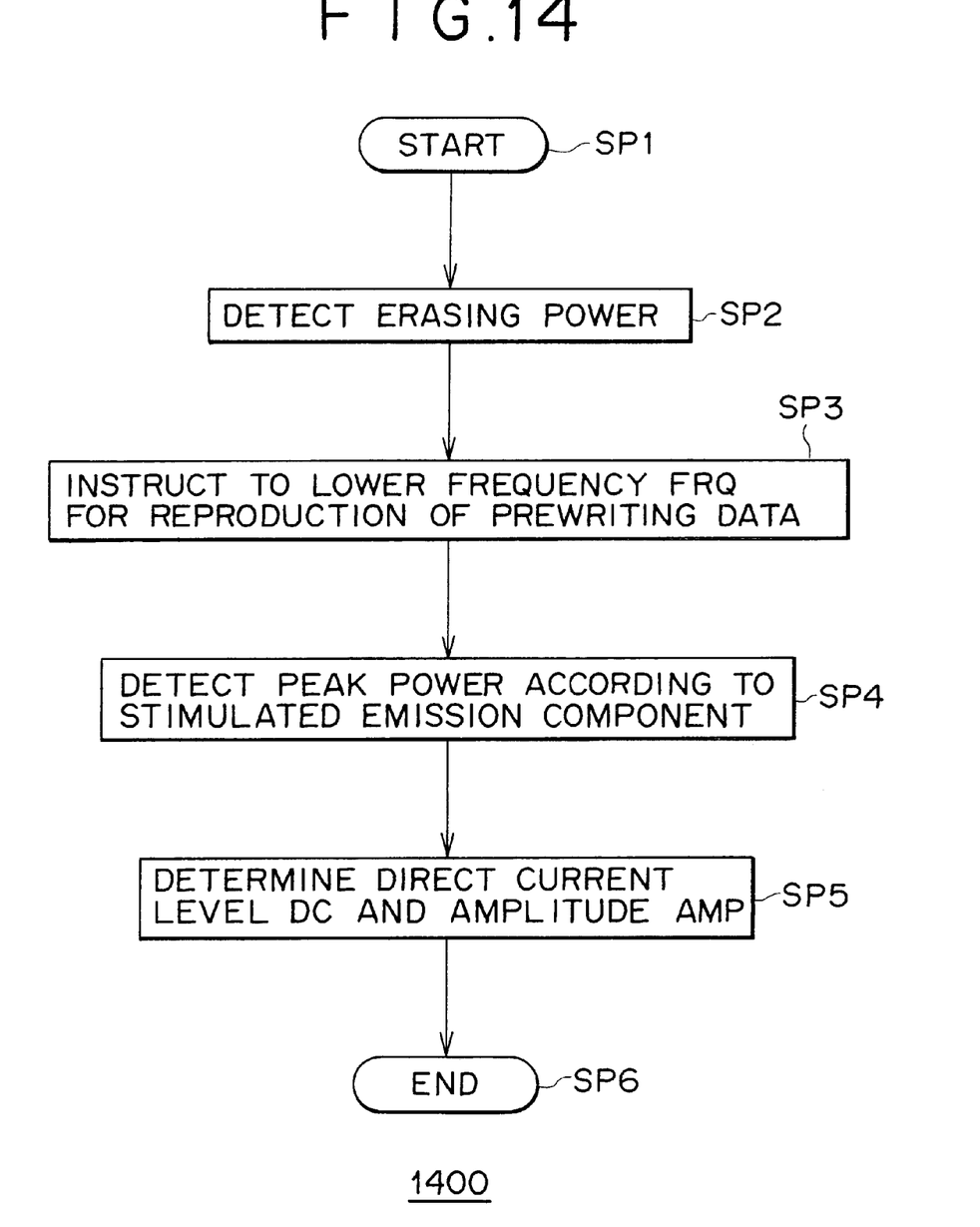
FIG. 14 is a flowchart of a processing sequence of a controller in an optical disk apparatus according to an embodiment of the present invention.

In optical disk apparatus 31, with optical disk 32 loaded, a controller 36 carries out a processing sequence 1400 shown in FIG. 14 to optimize signal level DC' of drive signal SD and amplitude AMP of high-frequency sine-wave signal S1 according to erasing power Pe recorded in the innermost area of optical disk 32.

Specifically, controller 36 goes from step SP1 to step SP2 to detect erasing power Pe as well as identification information, etc. of optical disk 32, which is recorded in the lead-in area of optical disk 32.

Then, controller 36 goes to step SP3 to instruct oscillator 32 to lower a frequency FRQ of high-frequency sine-wave signal S1. As shown in FIG. 9, controller 36 instructs oscillator 32 to lower frequency FRQ of high-frequency sine-wave signal S1 to the extent that when the quantity of light of laser beam L1 detected by monitor signal SM varies, the peak power according to the relaxation oscillation component and the peak power according to the stimulated emission component are sufficiently separated, and the peak power according to the stimulated emission component can reliably be detected by the peak hold method or the like.

After having recorded predetermined prewriting data in a prewriting area provided on optical disk 32, controller 36 reproduces the prewriting data under conditions indicated to oscillator 23. For reproducing the prewriting data, controller 36 corrects signal level DC' and amplitude AMP, which are preset for standard reproduction based on erasing power Pe reproduced from optical disk 32, and instructs the reproduction of the prewriting data based on the corrected signal level DC' and amplitude AMP.

Then, controller 36 goes to step SP4 to hold and read the peak of monitor signal SM outputted from current-to-voltage converter 19 for thereby detecting the peak power according to the stimulated emission component. Then, controller 36 goes to step SP5 to correct signal level DC' and amplitude AMP, which are temporarily set upon reproduction of the prewriting data, to satisfy formulas (1) and (2) based on the detected peak power, thus determining signal level DC' and amplitude AMP for reproduction.

Having thus determined signal level DC' and amplitude AMP, controller 36 goes to step SP6 to end processing sequence 1400. For reproducing data recorded in optical disk 32 according to a command from the host, controller 36 instructs the reproduction under the determined conditions to the circuit blocks.

In this embodiment, the driving conditions are set depending on optical disk 32 such that the peak power of laser beam L1 except for the relaxation oscillation component does not exceed erasing power Pe required to erase the data. Therefore, reproduction conditions can appropriately be established depending on optical disk 32 according to a simple and reliable condition setting process, and hence optical disks having various recording film characteristics can easily and reliably be handled.

By setting the power of the laser beam according to the reference power recorded in optical disk 32, the reproduction conditions can easily be established.

By finally setting up the power of the laser beam based on the reproduced signal from optical disk 32, jitter can reliably be reduced to reproduce desired data stably.

In this embodiment, the power of laser beam L1 is finally set based on the reproduced signal of the prewritten data. However, the present invention is not limited to such setting of the power of laser beam L1. If practically sufficient characteristics can be obtained, then the power of laser beam L1 may be set simply according to the reference power recorded in optical disk 32. Conversely, if practically sufficient characteristics can be obtained from only the reproduced signal of the prewritten data, the acquisition of the reference power from optical disk 32 may be omitted, and the driving conditions can be set based on only the reproduced signal of the prewritten data. Accordingly, a wide range of various other processes of setting up the driving conditions are also applicable.

In the above embodiments, the peak power except for the relaxation oscillation component is detected by making use of the difference in time between peaks. However, the present invention is not limited to such detection of the peak power. Since the stimulated emission component is a frequency component of high-frequency sine-wave signal S1, the detected signal of the quantity of light may be limited in bandwidth, and the peak power according to the stimulated emission component may be detected. A wide range of various other processes of detecting the peak power are also applicable.

In the above embodiments, the data recorded in phase-change-type optical disk 32 is reproduced. However, the present invention is not limited to such an optical disk, but is applicable to the reproduction of data recorded in, say, a magneto-optical disk, if necessary.

In the above embodiments, the present invention is applied to an optical disk apparatus. However, the present invention is not limited to an optical disk apparatus, but is widely applicable to an optical information reproducing apparatus for reproducing an optical information recording medium capable of reproducing recorded data with the application of a laser beam, such as a card-type recording medium having an information recording surface similar in structure to an optical disk.

According to the present invention, as described above, the power of laser beam L1 is set such that the peak power of laser beam L1 except for the relaxation oscillation component does not exceed power Pe required to erase the data, so that conditions for driving laser diode 5 with drive signal SD having high-frequency signal S1 superimposed thereon can easily and reliably be selected.

It will thus be seen that the objects set forth above, among those made apparent from the preceding description, are efficiently attained and, because certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An information reproducing apparatus for reproducing data recorded in an information recording medium, said apparatus comprising:
   a laser source for emitting a laser beam;
   a drive signal generator for generating a drive signal;
   a high-frequency signal generator for generating a high-frequency signal and superimposing the high-frequency signal on the drive signal; and
   a controller for controlling the laser source, wherein
      the drive signal with the high-frequency signal superimposed thereon intermittently energizes the laser source, and
      the controller sets a peak power for the laser beam, excluding a relaxation oscillation component, to not exceed an erase power required to erase the data recorded in the information recording medium.

2. The information reproducing apparatus according to claim 1, wherein the controller sets an average power for the laser beam, excluding the relaxation oscillation component, to lower than ½ the erase power.

3. The information reproducing apparatus according to claim 2, wherein the controller controls an amplitude of the high-frequency signal so that a resulting power of the laser beam, excluding the relaxation oscillation component, is higher than twice the average power and lower than twice a result of the average power subtracted from the erase power.

4. The information reproducing apparatus according to claim 1, further comprising a detector for detecting a power of the laser beam excluding the relaxation oscillation component.

5. The information reproducing apparatus according to claim 4, wherein the detector detects the power of the laser beam, excluding the relaxation oscillation component, by changing a frequency of the high-frequency signal.

6. The information reproducing apparatus according to claim 1, wherein the optical information recording medium is replaceable, and the controller controls the laser source according to a characteristic of the information recording medium.

7. The information reproducing apparatus according to claim 6, wherein the controller sets the peak power according to a reference power recorded in the information recording medium.

8. The information reproducing apparatus according to claim 6, wherein said controller sets the peak power according to a reproduced signal from the information recording medium.

9. An information reproducing apparatus for reproducing data recorded in an information recording medium, said apparatus comprising:
   a semiconductor laser diode for emitting a laser beam;
   a driver for generating a drive signal to drive the semiconductor laser diode;
   an oscillator for generating a high-frequency signal and superimposing the high-frequency signal on the drive signal; and
   a controller for controlling the driver, wherein the controller sets a peak power for the laser beam, excluding a relaxation oscillation component, to not exceed an erase power required to erase the data recorded in the information recording medium.

10. The information reproducing apparatus according to claim 9, wherein the controller sets an average power for the laser beam, excluding the relaxation oscillation component, to lower than ½ the erase power.

11. The information reproducing apparatus according to claim 9, wherein the controller controls an amplitude of the-high-frequency signal so that a resulting power of the laser beam, excluding the relaxation oscillation component, is higher than twice the average power and lower than twice a result of the average power subtracted from the erase power.

12. The information reproducing apparatus according to claim 9, further comprising a detector for detecting a power of the laser beam excluding the relaxation oscillation component.

13. The information reproducing apparatus according to claim 12, wherein the detector detects the power of the laser beam excluding the relaxation oscillation component by changing a frequency of the oscillator.

14. A method of setting a quantity of light in an information reproducing apparatus, comprising the steps of:
   generating a drive signal;
   generating a high-frequency signal;
   superimposing the high-frequency signal on the drive signal;

intermittently energizing a laser source with the drive signal having the high-frequency signal superimposed thereon for applying a laser beam to an information recording medium to reproduce data recorded in the information recording medium; and setting a peak power of the laser beam, excluding a relaxation oscillation component, to not exceed an erase power required to erase the data recorded in the information recording medium.

15. The method according to claim 14, further comprising the step of setting an average power of the laser beam, excluding the relaxation oscillation component, to lower than ½ the erase power.

16. The method according to claim 15, wherein an amplitude of the high-frequency signal is controlled so that a resulting power of the laser beam, excluding the relaxation oscillation component, is higher than twice the average power and lower than twice a result of the average power subtracted from the erase power.

17. The method according to claim 14, further comprising the step of detecting a power of the laser beam excluding the relaxation oscillation component.

18. The method according to claim 17, wherein the detecting step detects the power of the laser beam, excluding the relaxation oscillation component, by changing a frequency of the high-frequency signal.

19. The method according to claim 14, wherein said optical information recording medium is replaceable, and the power of said laser beam is set according to a characteristic of the information recording medium.

20. The method according to claim 19, wherein the power of said laser beam is set according to a reference power recorded in said information recording medium.

21. The method according to claim 19, wherein the power of said laser beam is set according to a reproduced signal from said optical information recording medium.

* * * * *